(12) United States Patent
Turk

(10) Patent No.: US 8,745,341 B2
(45) Date of Patent: Jun. 3, 2014

(54) WEB SERVER CACHE PRE-FETCHING

(75) Inventor: Mladen Turk, Zagreb (HR)

(73) Assignee: Red Hat, Inc., Raleigh, NC (US)

( * ) Notice: Subject to any disclaimer, the term of this patent is extended or adjusted under 35 U.S.C. 154(b) by 895 days.

(21) Appl. No.: 12/014,527

(22) Filed: Jan. 15, 2008

(65) Prior Publication Data
US 2009/0182941 A1    Jul. 16, 2009

(51) Int. Cl.
*G06F 12/16*    (2006.01)

(52) U.S. Cl.
USPC .................................. 711/162; 711/E12.103

(58) Field of Classification Search
None
See application file for complete search history.

(56) References Cited

U.S. PATENT DOCUMENTS

| | | | |
|---|---|---|---|
| 2003/0115421 A1* | 6/2003 | McHenry et al. | 711/133 |
| 2005/0154781 A1* | 7/2005 | Carlson et al. | 709/203 |
| 2005/0246347 A1* | 11/2005 | Kobayashi | 707/10 |
| 2006/0174198 A1* | 8/2006 | Brown et al. | 715/530 |
| 2007/0233898 A1* | 10/2007 | Raviv et al. | 709/238 |
| 2008/0168229 A1* | 7/2008 | Beelen et al. | 711/118 |
| 2009/0094417 A1* | 4/2009 | Carlson et al. | 711/137 |

* cited by examiner

*Primary Examiner* — Charles Rones
*Assistant Examiner* — Ryan Dare
(74) *Attorney, Agent, or Firm* — Lowenstein Sandler LLP

(57) ABSTRACT

A method and apparatus for a server that includes a file processor that interprets each requested data file, such as a web page, requested by a client in a process analogous to that of a browser application or other requesting application. The file processor initiates the loading of each referenced data item within the requested document in anticipation that the client will make the same requests upon receiving the requested data file. Each referenced data item is loaded into the server cache. When the client browser application requests these referenced data items they can be returned to the client browser application without accessing a slower persistent data storage. The requested data items are loaded from the server cache, which has a faster access time than the persistent data storage.

20 Claims, 4 Drawing Sheets

WEB SERVER CACHE PRE-FETCHING

TECHNICAL FIELD

Embodiments of the present invention relate to management of a resource server cache. Specifically, the embodiments relate to a method and apparatus for determining and fetching data that will be requested by a client and storing the data in the server cache before a request for the data is received from the client.

BACKGROUND

FIG. 1 is a diagram of a client interaction with a web server. The client 101 is a computer that is communicating with a web server 109 over a network. The client 101 is executing a browser 103. A user interacts with a browser 103 to request a web page 105. The sequence of requests and responses 111A-H is illustrated with the requests in a sequence with the first request 111A at the top of the set of requests and the last response 111H at the bottom.

The web browser 103 generates a request 111A for a web page 105. The request 111A is sent to the web server 109 that provides the web page 105. The web server 109 responds to the request 111A by retrieving the web page 105 from a storage location and returning the web page 105 in a response 111B. The web browser 103 then interprets the web page 105 to determine each element of the web page 105 that must be requested from the web server 109 to complete the web page 105 for display to the user. The example web page 105 includes an image 107A and two frames 107B, C.

The web browser 103 generates a request for each embedded item found while interpreting the received web page 105. In the example, the image 107A is found first and a request 111C is sent to the web server 109 to obtain the image 107A. The web server 109 receives the request 111C and retrieves the image 107A from a storage location and generates a response 111D to provide the image 107A to the client 101.

The web browser 103 continues to interpret the web page 105 and generates requests 111E, G for the two frames 107B, C. The web server 109 receives these requests 111E, G and retrieves the data requested for each frame 107B, C and generates responses 111F, H to provide this data to the browser 103.

FIG. 2 is a diagram of a system for providing web pages and related content to a client. The client 101 is a computer connected to the web server 109 over a network 207. The network is typically the Internet. The web server 109 is a dedicated server computer that executes a web server program. The web server 109 also provides a page cache 201. The page cache 201 is a part of the system memory of the web server 209 that is utilized by the web server 109 to store recently or frequently accessed data.

The web server 109 is in communication with a database 203 and a dynamic content provider 205. The web server 109 interacts with the database 203 and dynamic content provider 205 to service requests. The database 203 stores data including static web pages and multimedia. The dynamic content provider 205 is an application or set of applications that provide web pages and embedded content in web pages that changes in response to changes in input parameters. For example, a dynamic content provider may be a news feed or stock ticker embedded in a web page.

The client 101 requests each web page and embedded item separately as it receives a user input such as a uniform resource locator (URL) identifying the requested data and as it interprets a received web page that contains additional URLs for embedded content as the client attempts to render the requested web page for a user.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
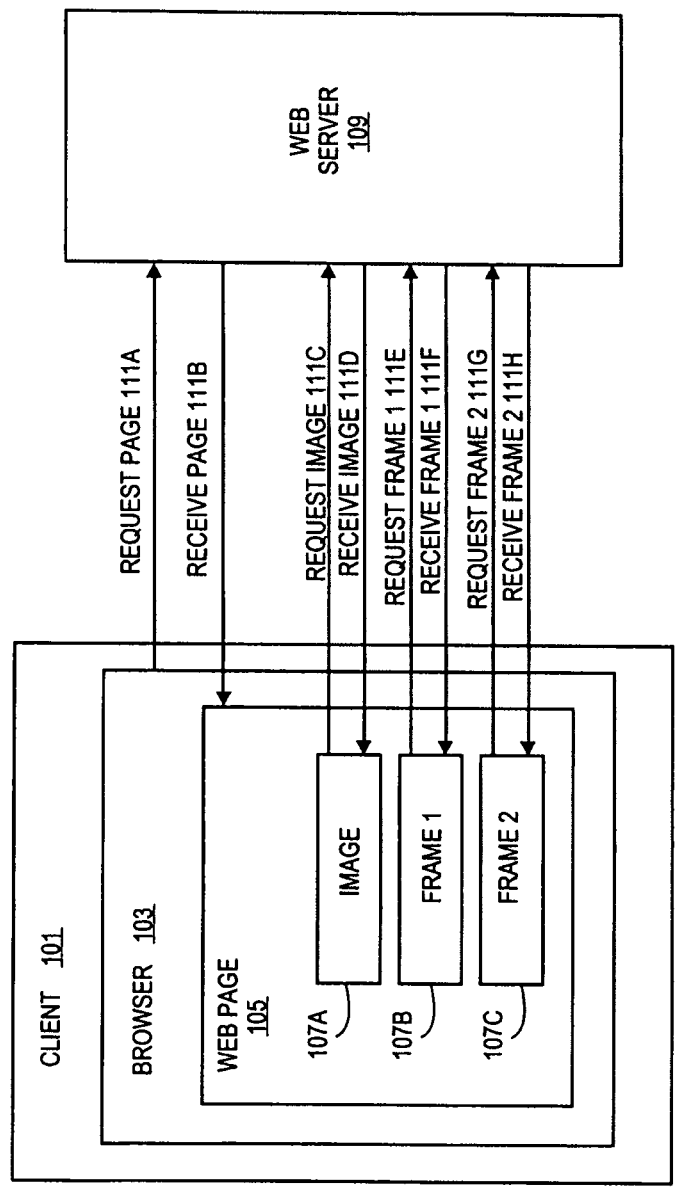
FIG. 1 is a diagram of a client interaction with a web server.
Figure 2:
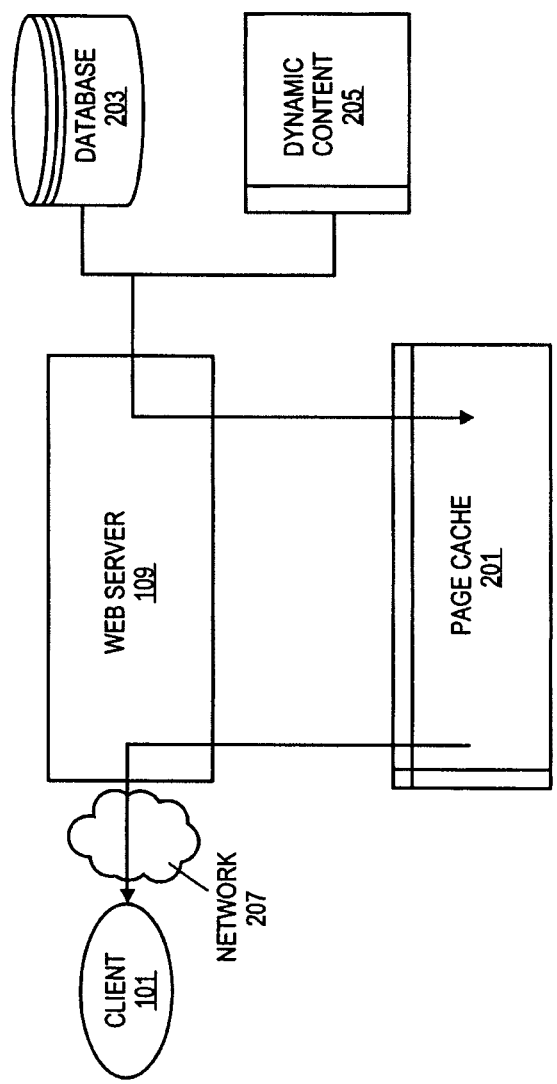
FIG. 2 is a diagram of a system for providing web pages and related content to a client.

Described herein is a method and apparatus for improving server response times to client requests by pre-fetching data to be accessed by the client. The server includes a file processor that interprets each file, such as a hypertext markup language (HTML) document, requested by a client. The file processor utilizes a process analogous to that of a browser application or similar interpreter application to parse the data file to identify embedded content. The file processor initiates the loading of each linked or referenced object, document or similar data items in anticipation that a client browser application or interpreter will make requests for the same data items upon receiving the requested data file. Each data item is loaded into the server cache from a persistent data storage. When the client browser application or interpreter requests the data items they can be returned to the client browser application or interpreter without accessing the persistent data storage. Instead, the requested data items are loaded from the server cache, which has a faster access time than the persistent data storage.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "generating," "determining," "selecting," "displaying," "searching," "receiving," "updating," "storing," "assigning," "requesting," "forwarding," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Figure 3:
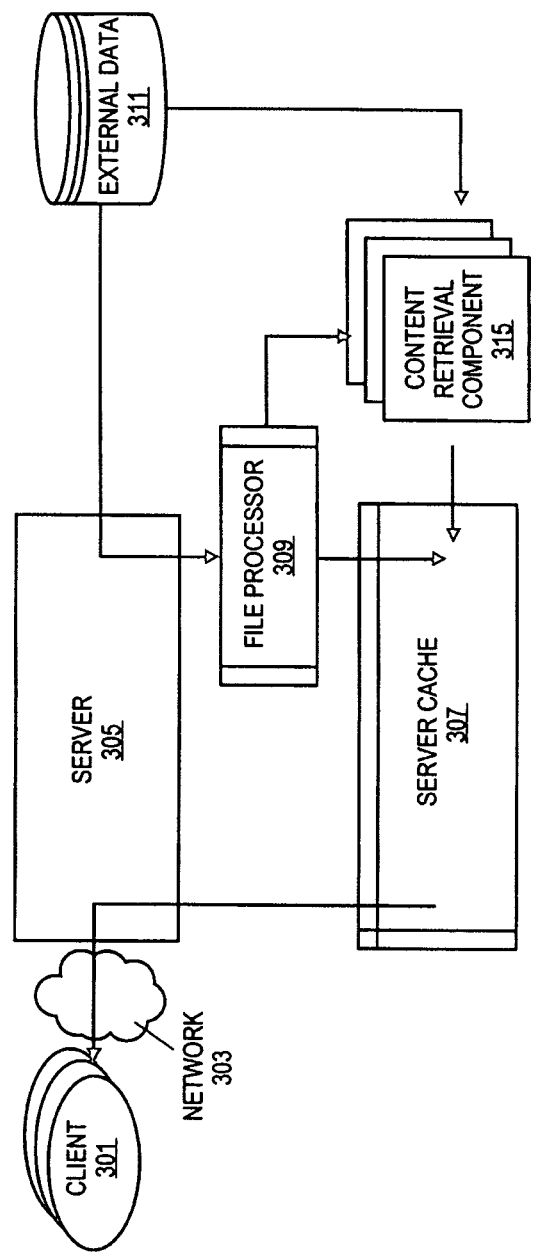
FIG. 3 is a diagram of a system for pre-fetching data items embedded in a data file and related content to be accessed by a client.

FIG. 3 is a diagram of a system for pre-fetching data items embedded in a data file and related content to be accessed by a client. The system services a set of clients 301 over a network 303 or similar communication system. A set, as used herein, indicates any positive whole number of items including one item. The client 301 can be any type of computing device capable of executing a browser, interpreter or similar application including a desktop computer, laptop computer, hand held device, cellular phone, console device or similar computing device. The network 303 can be a local area network (LAN), wide area network (WAN), such as the Internet, or similar communication network.

The system includes a server 305, a server cache 307, a file processor 309, a set of content retrieval components 313, a set of external persistent data storage units 311 (referred to herein as "external data storage component" 311) and similar components. The system can also include a load balancer and any number of resource nodes providing application servers or other resources and similar components. The illustrated embodiment is provided by way of example and one of ordinary skill in the art would understand that other analogous components could be used in conjunction with or in place of the illustrated components discussed herein.

The server 305 can be any application capable of communicating with a client across a network to provide a resource such as a web page and its constituent components. For example, the server 305 can be a web server, such as an Apache HTTP Server by the Apache Software Foundation of Forest Hill, Md., an Internet Information Service (IIS) server by Microsoft of Redmond, Wash. or similar web server applications. The server 305 communicates with a browser application or similar application of the client 301 using an established protocol such as the hypertext transfer protocol (HTTP), file transfer protocol (FTP) or similar data communication protocol. The example of a server 305 being a web server is one embodiment presented for sake of illustration. One skilled in the art would understand that the principles an components described herein are also applicable to other similar resource client/server systems.

The server cache 307, file processor 309 and content retrieval components 313 can be separate components or sub-components of the server 305 or any combination thereof. The server cache 307 is a data structure and cache management system for storing and managing objects, documents and similar data data items that have been recently accessed or have been pre-fetched due to anticipated access. In one embodiment, the server cache 307 is a data structure in a local memory such as a system memory. In another embodiment, the server cache 307 stores data in a specialized hardware memory device. In any embodiment, the memory storage device of the server cache 307 is a fast access memory device such a random access memory (RAM) memory module. The server cache 307 has faster access times, typically at least an order of magnitude faster, than the external data storage component 311, which stores the data provided by the server persistently. The server cache 307 enables the server 305 to provide improved response times over access of data resources from the external data storage component 311. The server cache 307 can utilize any cache replacement scheme when the cache is full to free space to receive a new entry. Similarly, the server cache 307 can utilize any maintenance algorithm to track which entries in the cache are valid.

The file processor 309 is a program executed by the server machine, another machine or combination of computer machines that can include the server machine. The file processor 309 interprets data structures such as web pages or other HTML documents retrieved from the external data storage component 311 and prepared to be sent to a client 301 in response to a request. The file processor 309 may interpret the retrieved data files in a manner analogous to a web browser application or similar browser or interpreter application on a client. The file processor 309 identifies embedded content indicators such as links, references or pointers while parsing or interpreting the data file. The file processor 309 then generates requests for data items referenced by the embedded content indicators.

For example, a client requests a web page provided by a web server. The web server receives the request and retrieves the web page from an external data storage 311, such as a file storage system. A copy of the web page is then stored in the web server cache. A copy of the web page is also sent to the file processor 309. The file processor 309 interprets the web page, which is encoded as an HTML document, an extensible markup language (XML) document or similar interpreted language document. The file processor 309 identifies the other data structures embedded or referenced (e.g., linked) within the data file. The file processor 309 then instantiates or calls an instance of a content retrieval component 313 to retrieve the embedded or reference data structures.

The content retrieval components 313 are applications, service routines or similar programs that can execute independently from the file processor 309 or server 305. The content retrieval components 313 receive an identifier of a resource to be retrieved from the external data storage component 311. The content retrieval components 313 access and retrieve the data indicated by the identifier and store the data in the server cache 307. The content retrieval component 313 can terminate upon completion of the load operation or can await a new assignment from the file processor 309. In one embodiment, the content retrieval components 313 can be instantiated or similarly generated by the file processor 309 to load each data item. In another embodiment, a set of content retrieval components 313 can execute at system startup and service calls from the content retrieval components as needed.

The external data storage component 311 can be any set of data storage devices, application servers and similar resources. For example, the external data storage component 311 can be a database management system and database that stores images and multimedia content embedded within a web page. The external data storage component 311 can also include a dynamic content provider that derives, calculates or similarly generates data to be utilized in relation to a web page or similar data file. For example, a dynamic content provider can be a stock ticker that generates a real-time data structure with current stock prices that can be read and displayed by a client browser application.

Figure 4:
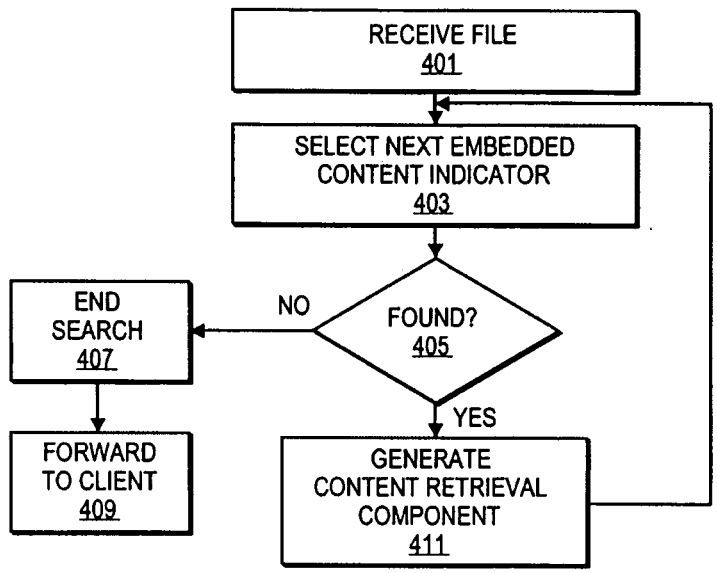
FIG. 4 is a process for pre-fetching embedded content related to a data file to be accessed by a client.

FIG. 4 is a process for pre-fetching embedded content related to a data file to be accessed by a client. The process is executed by a file processor or similar component. The file processor can execute as a process separate from and independent of other server components. Any type of file can be processed. In one embodiment, a separate file processor handles each type of file or a set of file types. The file processor receives the data file to be processed from the server or the external data storage component (block 401). The data file can be an HTML, XML, text document or similar file. An appropriate file processor can be selected by a server or similar program. The file type can be identified by internal information such as header information or meta data, by the source of the file (e.g., the type or name of the server providing the file) or through similar identifying information.

The file processor analyzes the data file by identifying a first embedded content data item, such as referenced object, image, document or similar content (block 403). Any parsing, interpreting, executing or similar program can be utilized to analyze the data file. In one embodiment, the file processor employs algorithms and techniques similar to an intended recipient application. For example, the file processor for an HTML document may parse the HTML document like a web browser to find the links to content within the HTML document.

A check is made to determine if an embedded content indicator has been found in the data file (block 403). If no embedded content indicator is found, then the search for embedded content indicators is ended. This endpoint is determined based on the type of file analysis and the algorithm employed to analyze the file. For example, an HTML document may be parsed sequentially from beginning to end. When the end of the HTML document file is reached, then the analysis of the document is ended. In response to ending the search or analysis of the received data file, the data file is forwarded to the client requesting the data file (block 409). In another embodiment, a copy of the data file can be forwarded to the client in parallel with the analysis of the data file by the file processor.

If a reference to an embedded content indicator is found in the data file, then a content retrieval component is called or instantiated to load the referenced content into the server cache (block 411). A separate content retrieval component can be instantiated for each data item referenced by embedded content indicators or a set of content retrieval components can load referenced data items based on any load balancing algorithm, based on file type or similar criteria. The content retrieval components can be called and passed the embedded content indicators as a parameter or through a similar mechanism. The analysis process can continue to identify embedded content indicators (block 403) and instantiate or call content retrieval components (block 411) until the entire data file has been parsed or interpreted.

Figure 5:
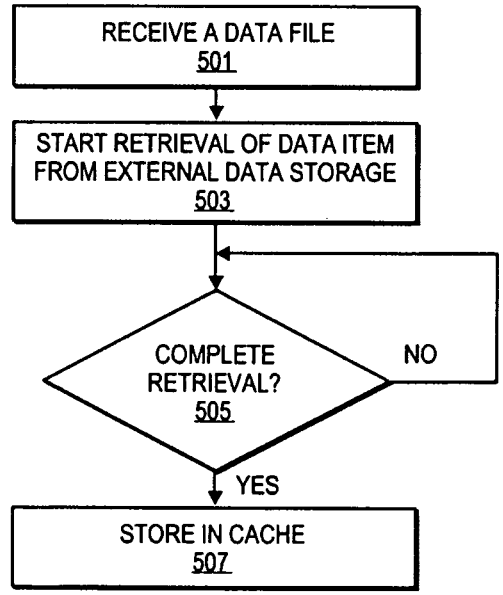
FIG. 5 is a diagram of one embodiment of a process for background loading of pre-fetched content.

FIG. 5 is a diagram of one embodiment of a process for background loading of pre-fetched content. The pre-fetching process is executed by a content retrieval component. The content retrieval component is instantiated or called by a file processor and provided a reference to embedded content as a parameter in the form of an embedded content indicator. For example, an HTML document can have uniform resource locators embedded within the document that indicate images or similar data files that are to be loaded and used to render the web page described by the HTML document (block 501). The content retrieval component executes independent of an in parallel with the file processor and other server components. The content retrieval component can execute as a background process.

The content retrieval component then initiates the retrieval of the referenced data file (block 503). In one embodiment, a content retrieval component can be associated with a specific external data storage component or computer that the content retrieval component accesses to retrieve stored data. In another embodiment, the content retrieval component determines the external data storage component or similar device by analysis of the received reference parameter such as a URL or similar embedded content identifier.

The retrieval process can be incremental using any data transfer process to load, stream or similarly transfer the data from the external data storage component to the content retrieval component. The content retrieval component can check with each received section, packet or data point, whether the entire document has been received from the external data storage component by checking for an end of file (EOF) indicator or similar indicator (block 505). Once the data item has been completely retrieved then the data item is stored in the server cache (block 507). If the data item has not completed its transfer, then the retrieval process continues until the end of the transfer is determined. The data item is then stored in the server cache once download of the data item has completed.

Thus, a method and apparatus for improving server response time by analyzing requested data files as they are returned to the requesting client and pre-fetching those data files into the server cache in anticipation that these embedded content items will be requested by the client upon receipt of the data file. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
   receiving, at a web server of a computing system from a web browser of a client, a request for a web page provided by the web server;
   in response to the request from the client, retrieving the web page from a data source, wherein the web page is a data file with a plurality of embedded content indicators, each of the plurality of embedded content indicators defining at least one of a link, a reference or a pointer to a data item external to the data file;
   sending, by the web server, a first copy of the web page to the web browser, wherein the web browser interprets the first copy of the web page to identify the plurality of embedded content indicators;
   sending, by the web server, a second copy of the web page to a file processor, wherein the file processor executes separately from the web server;
   identifying the plurality of embedded content indicators of the web page by the file processor, wherein the file processor is configured to interpret the second copy of the web page like the web browser interprets the first copy;
   passing the identified plurality of embedded content indicators to content retrieval components to retrieve the data items specified by the plurality of embedded content indicators; and
   storing the data items into a web server cache, wherein the data items are stored into the web server cache prior to a request for the data items by the web browser from the data source.

2. The computer-implemented method of claim 1, wherein the data source is an external data source.

3. The computer-implemented method of claim 1, wherein the content retrieval components execute in parallel to the web server and the file processor as background processes.

4. The computer-implemented method of claim 1, further comprising:
   iterating through each of the plurality of embedded content indicators by the file processor; and
   generating a separate content retrieval component of the content retrieval components for each of the plurality of embedded content indicators.

5. The computer-implemented method of claim 1, wherein the data file is a hypertext mark-up language document.

6. The computer-implemented method of claim 1, wherein at least one of the plurality of embedded content indicators is a uniform resource locator.

7. The computer-implemented method of claim 1 further comprising:
   retrieving the data items from the data source by the content retrieval components, wherein each of the content retrieval components is configured to execute independent of the file processor or and the web server to retrieve a corresponding one of the data items from the data source.

8. A non-transitory computer readable medium having a set of instructions stored therein, which when executed cause a computer to perform a set of operations comprising:
   receiving, at a web server of a computing system from a web browser of a client, a request for a web page provided by the web server;
   in response to the request from the client, retrieving the web page from a data source, wherein the web page is a data file with a plurality of embedded content indicators, each of the plurality of embedded content indicators defining at least one of a link, a reference or a pointer to a data item external to the data file;
   sending, by the web server, a first copy of the web page to the web browser, wherein the web browser interprets the first copy of the web page to identify the plurality of embedded content indicators;
   sending, by the web server, a second copy of the web page to a file processor, wherein the file processor executes separately from the web server;
   identifying the plurality of embedded content indicators of the web page by the file processor, wherein the file processor is configured to interpret the second copy of the web page like the web browser interprets the first copy;
   passing the identified plurality of embedded content indicators to content retrieval components to retrieve the data items specified by the plurality of embedded content indicators; and
   storing the data items into a web server cache, wherein the data items are stored into the web server cache prior to a request for the data items by the web browser from the data source.

9. The non-transitory computer readable medium of claim 8, wherein the data source is an external data source.

10. The non-transitory computer readable medium of claim 8, wherein the content retrieval components execute in parallel to the web server and the file processor as background processes.

11. The non-transitory computer readable medium of claim 8, further comprising:
    iterating through each of the plurality of embedded content indicators by the file processor; and
    generating a separate content retrieval component of the content retrieval components for each of the plurality of embedded content indicators.

12. The non-transitory computer readable medium of claim 8, wherein the data file is a hypertext mark-up language document.

13. The non-transitory computer readable medium of claim 8, wherein at least one of the plurality of embedded content indicators is a uniform resource locator.

14. The non-transitory computer readable medium of claim 8 further comprising:
    retrieving the data items from the data source by the content retrieval components, wherein each of the content retrieval components is configured to execute independent of the file processor or and the web server to retrieve a corresponding one of the data items from the data source.

15. A computing system comprising:
    a web server configured to execute on the computing system to receive requests from a web browser of a client for web pages provided by the web server, wherein the web server is configured to retrieve the web page from a data source, wherein the web page is a data file comprising a plurality of embedded indicators defining at least one of a link, a reference or a point to a data item external to the data file, wherein the web server is configured to send a first copy of the web page to the web browser and to send a second copy of the web page to a file processor, wherein the file processor executes separately from the web server, wherein the web browser interprets the first copy of the web page to identify the plurality of embedded content indicators;
    the file processor configured to analyze the second copy of the web page to identify the plurality of embedded content indicators, wherein the file processor is configured to interpret the second copy like the web browser interprets the first copy, wherein the file processor is configured to pass the identified plurality of embedded content indicators to content retrieval components to retrieve the data items specified by the plurality of embedded content indicators;

a web server cache to store the data items, wherein the data items are stored into the web server cache prior to a request for the data items by the web browser from the data source.

16. The system of claim 15, wherein the content retrieval components execute independently and in parallel with the web server and the file processor as background processes.

17. The system of claim 15, wherein the file processor iterates through each of the plurality of embedded content indicators and generates a separate content retrieval component of the content retrieval components for each of the plurality of embedded content indicators.

18. The system of claim 15, wherein the data file is a hypertext mark-up language document.

19. The system of claim 15, wherein at least one of the plurality of embedded content indicators is a uniform resource locator.

20. The system of claim 15 wherein the content retrieval components are configured to receive the identified plurality of embedded content indicators and to retrieve the data items from the data source by the content retrieval components, wherein each of the content retrieval components is configured to execute independent of the file processor and the web server to retrieve a corresponding one of the data items from the data source.

* * * * *